US012773366B2

(12) United States Patent
Sabino et al.

(10) Patent No.: US 12,773,366 B2
(45) Date of Patent: Oct. 27, 2026

(54) ARTICULATING HOSPITAL BED MOUNTED EXERCISE BIKE

(71) Applicant: Bedside Bike LLC, Newburgh, IN (US)

(72) Inventors: Brian Sabino, Hoboken, NJ (US); Neil Jairath, Newburgh, IN (US); Vartan Pahalyants, New York, NY (US); Monil Patel, Brooklyn, NY (US); Shayan Cheraghlou, Pittsburgh, PA (US); Jeff Bohnen, Saline, MI (US)

(73) Assignee: KinetiTec, Inc., Indianapolis, IN (US)

(*) Notice: Subject to any disclaimer, the term of this patent is extended or adjusted under 35 U.S.C. 154(b) by 63 days.

(21) Appl. No.: 19/041,407

(22) Filed: Jan. 30, 2025

(65) Prior Publication Data

US 2026/0215990 A1 Jul. 30, 2026

(51) Int. Cl.
*A61H 1/02* (2006.01)
*A63B 22/06* (2006.01)

(52) U.S. Cl.
CPC ....... *A61H 1/0214* (2013.01); *A63B 22/0605* (2013.01); *A63B 2022/0652* (2013.01); *A63B 2210/04* (2013.01)

(58) Field of Classification Search
CPC .............. A61H 1/0214; A63B 22/0605; A63B 2022/0652; A63B 2210/04
See application file for complete search history.

(56) References Cited

U.S. PATENT DOCUMENTS 3,455,295 A * 7/1969 Kellogg ............... A63B 22/001 482/904
3,713,438 A 1/1973 Knutsen
(Continued)

FOREIGN PATENT DOCUMENTS

CN 106618946 A 2/2019
CN 110279558 B 3/2024
(Continued)

OTHER PUBLICATIONS

Exerciser, Non-Measuring for Stroke Rehabilitation, https://www.accessdata.fda.gov/scripts/cdrh/cfdocs/cfpcd/classification.cfm?id=PKS.
Google Translation of DE4113135, accessed Apr. 14, 2025, 6 pages.
Concentrical Continuous Passive Motion Machine, https://www.accessdata.fda.gov/scripts/cdrh/devicesatfda/index.cfm?db=pmn&id=K850030, Dated: Jan. 4, 1985.
(Continued)

*Primary Examiner* — Sundhara M Ganesan
(74) *Attorney, Agent, or Firm* — Woodard, Emhardt, Henry, Reeves & Wagner, LLP; William A. McKenna

(57) ABSTRACT

Disclosed is an exercise device securable to beds in health-care settings for patients enduring periods of bed-based care. The exercise device comprises a frame that houses a number of electrical components and a resistance assembly. The resistance assembly permits adjustment of the difficulty of patient exercise. Attached to the frame is either a pedal assembly or an arm exercise unit, or both, allowing for upper and lower body exercise. The exercise device includes a clamp assembly configured to securely attached the exercise device to the bed. Further, the position of the exercise device can be adjusted to accommodate various sizes of patients by adjusting an adjustment assembly that connects the frame to the clamp assembly. The frame may house a wireless communication module configured to collect and transmit exercise metrics of the patient/activity, as well as facilitate device setup, positioning, and setting adjustments to personalize activities to each patient.

21 Claims, 16 Drawing Sheets

(56) References Cited

U.S. PATENT DOCUMENTS

| | | | | | |
|---|---|---|---|---|---|
| 4,601,464 | A * | 7/1986 | Mousel | A63B 22/0694 | 601/35 |
| 4,615,335 | A * | 10/1986 | Searcy | A63B 21/00178 | 482/904 |
| 4,738,445 | A * | 4/1988 | Lautenschlager | A63B 22/0605 | 482/142 |
| 4,925,184 | A * | 5/1990 | McJunkin, Jr. | A63B 22/0694 | 482/904 |
| 5,279,530 | A | 1/1994 | Hess | | |
| 5,820,519 | A | 10/1998 | Slenker | | |
| 6,152,855 | A | 11/2000 | Dean, Jr. et al. | | |
| 6,270,445 | B1 | 8/2001 | Dean, Jr. et al. | | |
| 9,687,401 | B2 * | 6/2017 | Alford | A61G 7/05 | |
| 10,018,298 | B2 | 7/2018 | Goldish et al. | | |
| 10,744,362 | B2 | 8/2020 | Goldish et al. | | |
| 2003/0092536 | A1 | 5/2003 | Romanelli et al. | | |
| 2004/0157708 | A1 * | 8/2004 | Matthews | A63B 22/0605 | 482/904 |
| 2005/0272566 | A1 | 12/2005 | Otsuka | | |
| 2007/0203434 | A1 * | 8/2007 | Namgung | A63B 23/0494 | 601/24 |
| 2011/0143898 | A1 * | 6/2011 | Trees | A63B 21/1672 | 482/142 |
| 2016/0045383 | A1 | 2/2016 | Soo | | |
| 2016/0206915 | A1 * | 7/2016 | Velert | A63B 22/0005 | |
| 2017/0035638 | A1 | 2/2017 | Koenig | | |
| 2018/0147444 | A1 * | 5/2018 | Murrell | A63B 23/0205 | |
| 2018/0304113 | A1 * | 10/2018 | Goldish | A63B 22/0694 | |
| 2020/0246658 | A1 * | 8/2020 | Small | A63B 21/4033 | |
| 2020/0330301 | A1 | 10/2020 | Zerhusen et al. | | |
| 2021/0291020 | A1 | 9/2021 | Chen et al. | | |
| 2021/0322235 | A1 * | 10/2021 | Hildenbrand | A61G 7/002 | |
| 2024/0139582 | A1 | 5/2024 | Dunkelberg | | |
| 2025/0242195 | A1 * | 7/2025 | Liu | A63B 21/4034 | |
| 2026/0077228 | A1 * | 3/2026 | Kang | A63B 22/0605 | |

FOREIGN PATENT DOCUMENTS

| | | | |
|---|---|---|---|
| KR | 100711104 | B1 | 4/2007 |
| WO | WO2000045897 | A1 | 8/2000 |
| WO | WO2012165880 | A9 | 9/2013 |
| WO | WO2018067684 | A1 | 4/2018 |

OTHER PUBLICATIONS

Bilateral Continuous Passive Motion Device https://www.accessdata.fda.gov/scripts/cdrh/devicesatfda/index.cfm?db=pmn&id=K871981, Dated: Jun. 17, 1987.

Continuous Passive Motion (CPM) Leg Exerciser https://www.accessdata.fda.gov/scripts/cdrh/devicesatfda/index.cfm?db=pmn&id=K902452, Dated: Jun. 11, 1990.

Continuous Passive Motion, https://www.accessdata.fda.gov/scripts/cdrh/devicesatfda/index.cfm?db=pmn&id=K841674, Dated: Apr. 23, 1984.

Stationary Exercise Bicycle, https://www.accessdata.fda.gov/scripts/cdrh/devicesatfda/index.cfm?db=pmn&id=K834098, Dated: Nov. 28, 1983.

Exercise Bicycle, https://www.accessdata.fda.gov/scripts/cdrh/devicesatfda/index.cfm?db=pmn&id=K926287, Dated: Dec. 14, 1992.

Hip Continuous Passive Motion Machine https://www.accessdata.fda.gov/scripts/cdrh/devicesatfda/index.cfm?db=pmn&id=K862314, Dated: Jul. 15, 1986.

ERG 550 Ergometer Bicycle, https://www.accessdata.fda.gov/scripts/cdrh/devicesatfda/index.cfm?db=pmn&id=K854491, Dated: Nov. 12, 1985.

ERG 551 Ergometer Bicycle, https://www.accessdata.fda.gov/scripts/cdrh/devicesatfda/index.cfm?db=pmn&id=K854492, Dated: Nov. 12, 1985.

Continuous Anatomical Passive Exerciser, https://www.accessdata.fda.gov/scripts/cdrh/devicesatfda/index.cfm?db=pmn&id=K830122, Dated: Jan. 11, 1983.

* cited by examiner

ARTICULATING HOSPITAL BED MOUNTED EXERCISE BIKE

FIELD OF THE INVENTION

The present disclosure broadly concerns exercise devices. More specifically, the present disclosure relates to exercise devices that can be mounted to beds in healthcare settings for patients enduring periods of bed-based care.

BACKGROUND

The present invention is directed to improvements in exercise devices for patients in healthcare institutions (including but not limited to skilled nursing facilities, rehabilitation facilities, home health care settings, and hospitals), enduring periods of bed-based care. A lack of patient mobility during prolonged healthcare institutionalizations is an epidemic in the American health care system. Over twelve million patients over the age of 65 are admitted to U.S. hospitals every year, with a vast majority of these patients spending 90% of their hospital stay, or more, immobilized in a hospital bed due to doctor-ordered bed rest, tangled IV lines, a lack of assistance, etc. The negative effects of prolonged time contained to a hospital bed can be detrimental to patient health and recovery. Specifically, immobility can lead to functional decline, an increased need for post-recovery rehabilitation, and in some cases, death. However, providing patients with at least ~900 steps or an equivalent amount of exercise daily can significantly prevent this hospital-acquired functional decline.

To worsen matters, there is limited data collected on how much movement a patient is able to perform during their hospital stay. This lack of data surrounding patient mobility leaves both patients and healthcare providers in the dark.

Thus, there is a need for improvement in the field to provide patients with exercise capability while also avoiding the risks of further injury which may arise from other traditional forms of exercise, such as walking.

SUMMARY OF THE INVENTION

The present disclosure includes certain embodiments for an exercise device that attaches to a patient's hospital bed. The exercise device is designed to fit efficiently and seamlessly within any healthcare setting (including but not limited to hospitals, skilled nursing facilities, rehabilitation settings, home health settings), on a hospital bed or potentially commercial bed, and to allow for easy deployment and use. The device itself is configured to only occupy a small portion at the foot of a hospital bed. Further, the exercise device is primarily made of lightweight materials, such as plastics and alloys, reducing the overall weight of the exercise device. By providing a small and lightweight exercise device, patient mobility and exercise can be increased leading to reduced in-patient hospital stays and improving patient outcomes. The exercise device is configured to collect and transmit patient exercise metrics, which gives healthcare providers insight into a patient's mobility and the overall health effects of regular exercise during prolonged hospital stays.

The exercise device includes a frame made up of a plurality of sidewalls, a top wall, and a bottom wall that defines an interior. The interior of the frame is configured to house various components of the exercise device. For example, the frame may house the resistance assembly of the exercise device, which provides various degrees of resistance during exercise depending on patient needs. The frame may also house other components, such as a wireless communication module, a battery, memory, etc. The wireless communication module is configured to collect and transmit the exercise metrics (e.g., resistance, duration, cadence, etc.) of the patient's activity. The wireless compatibility of the device is designed not to interfere with medical equipment including but not limited to pacemakers, defibrillators, and telemetry. This information can be stored in a patient-accessible app, integrated into the healthcare provider's electronic medical records, made a part of a bedside display or the like. The frame may also include other components, such as a user interface to allow access to device/system settings and/or interactive media to encourage exercise.

The exercise device is outfitted with either a pedal assembly to provide lower body muscle activation via bicycle exercise, an arm exercise unit to provide upper body muscle activation, or both. The pedal assembly and/or the arm exercise unit are mechanically connected to the resistance assembly, allowing both forms of exercise to be set at varying degrees of difficulty to allow for various exercise routines/regimens. The frame may further include a resistance control knob to adjust the resistance level required to pedal the pedal assembly and/or pull the arm exercise unit. In some embodiments, the resistance level may be adjusted by the user interface or remotely via a mobile app.

The resistance assembly itself may include a number of gear assemblies comprising a large gear in mechanical connection with a small gear via a belt. In some embodiments, the resistance applied to the pedal assembly/arm exercise unit is adjusted by utilizing a gear assembly having a different gear ratio or an adjustable friction or other known resistance source, which will either increase or decrease the resistance of the exercise device. In some embodiments, the resistance assembly may include one or more sets of magnets implemented to provide additional resistance without adding much weight to the exercise device.

The exercise device is securely attached to the footrest of a hospital bed via a clamp assembly. The clamp assembly includes at least two pressure plates that define a space therebetween. When placed, the footrest of the hospital bed is between the pressure plates of the clamp assembly of the exercise device. The pressure plates can then be closed, creating a secure connection between the exercise device and the hospital bed.

The exercise device includes an adjustment assembly that is connected to the frame of the device at one end and the clamp assembly at the other. The device may include an additional component which contacts the bed surface for additional stability. The adjustment assembly is configured to alter the position of the frame on the hospital bed relative to the clamp assembly/footrest, allowing for customized positioning based on patient needs.

Further objects, features, and advantages of the present invention shall become apparent from the detailed drawings and descriptions provided herein. Each embodiment described is not intended to address every object described herein, and each embodiment does not include each feature described. Some or all of these features may be present in the corresponding independent or dependent claims, but should not be construed to be a limitation unless expressly recited in a particular claim.

DETAILED DESCRIPTION OF THE INVENTION

Figure 1:
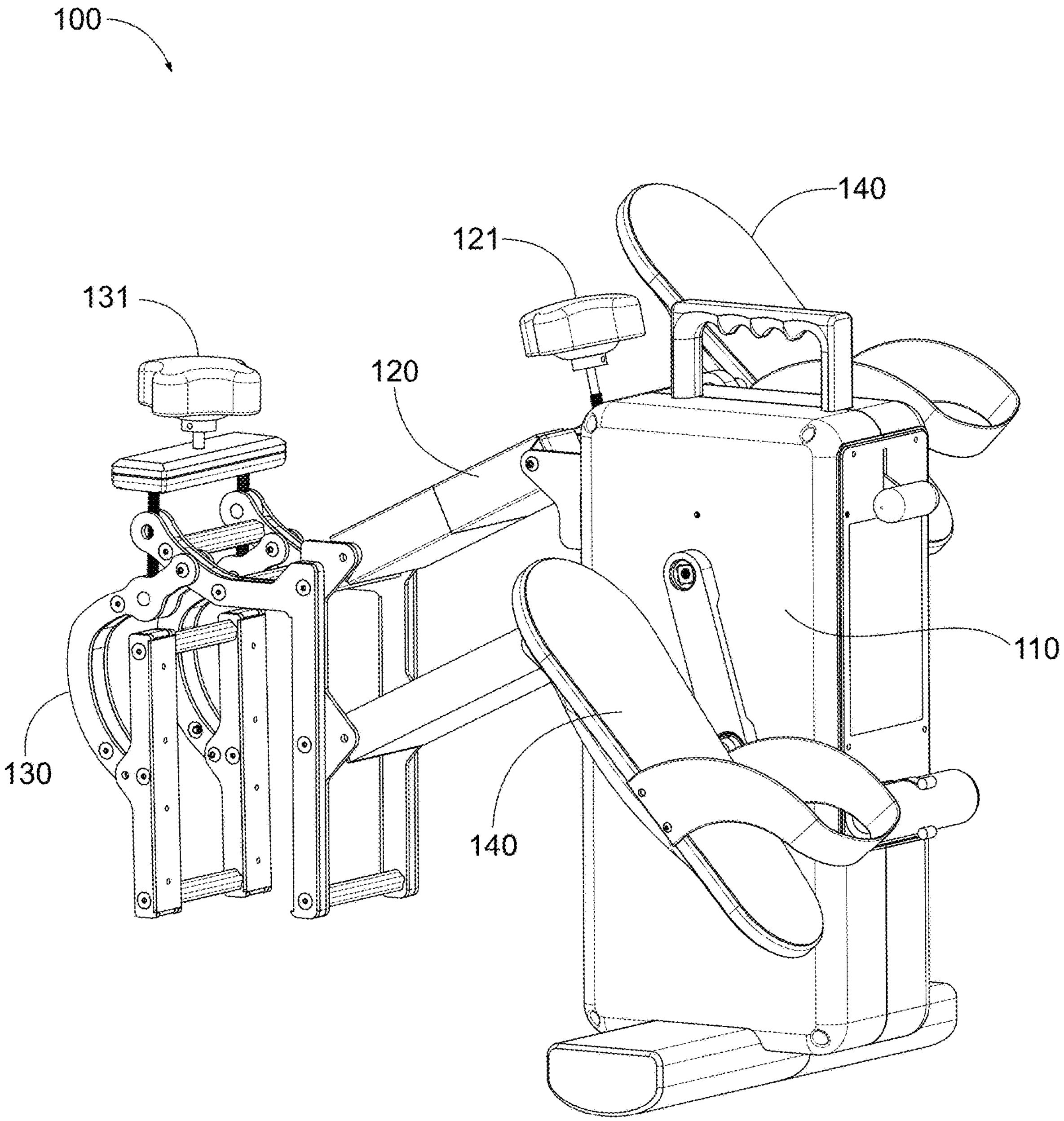
FIG. 1 is a front perspective view of an embodiment of an exercise device.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The present disclosure includes certain embodiments for an exercise device that attaches to a patient's hospital bed. The exercise device is designed to fit efficiently and seamlessly within any healthcare setting (including but not limited to hospitals, skilled nursing facilities, rehabilitation settings, home health settings), on a hospital bed or potentially commercial bed, and to allow for easy deployment and use. By way of non-limiting examples, hospital beds may include beds manufactured by Invacare (e.g., G5510 G-Series, 5410IVC, 5410LOW, BAR750 Bariatric), Delta (e.g., Ultra Light 1000), Drive (e.g., Competitor II, Multi-Height Bed,), Medline (e.g., Altera 1232), and Jorens (e.g., Care 100 Low Hospital Bed, UltraCare, EasyCare). Other manufacturers of similar beds are also contemplated. Furthermore, despite being referred to as a "hospital bed", it shall be appreciated that such beds may be and are commonly used outside of a hospital, such as in a rehabilitation facility, nursing home, treatment facility, other medical facility or even an individual's own home, and all such locations shall be considered a "hospital bed."

The device itself is configured to only occupy a small portion at the foot of a hospital bed. Further, the exercise device is primarily made of lightweight materials, such as plastics and alloys, reducing the overall weight of the exercise device. By providing a small and lightweight exercise device, patient mobility and exercise can be increased leading to reduced in-patient hospital stays and improving patient outcomes. The exercise device is configured to collect and transmit patient exercise metrics, which gives healthcare providers insight into a patient's mobility and the overall health effects of regular exercise during prolonged hospital stays.

The exercise device includes a frame made up of a plurality of sidewalls, a top wall, and a bottom wall that defines an interior. The interior of the frame is configured to house various components of the exercise device. For example, the frame may house the resistance assembly of the exercise device, which provides various degrees of resistance during exercise depending on patient needs. The frame may also house other components, such as a wireless communication module, a battery, memory, etc. The wireless communication module is configured to collect and transmit the exercise metrics (e.g., resistance, duration, cadence, etc.) of the patient's activity. The wireless compatibility of the device is designed not to interfere with medical equipment including but not limited to pacemakers, defibrillators, and telemetry. This information can be stored in a patient-accessible app, integrated into the healthcare provider's electronic medical records, made a part of a bedside display or the like. The frame may also include other components, such as a user interface to allow access to device/system settings and/or interactive media to encourage exercise.

The exercise device is outfitted with either a pedal assembly to provide lower body muscle activation via bicycle exercise, an arm exercise unit to provide upper body muscle activation, or both. The pedal assembly and/or the arm exercise unit are mechanically connected to the resistance assembly, allowing both forms of exercise to be set at varying degrees of difficulty to allow for various exercise routines/regimens. The frame may further include a resistance control knob to adjust the resistance level required to pedal the pedal assembly and/or pull the arm exercise unit. In some embodiments, the resistance level may be adjusted by the user interface or remotely via a mobile app.

The resistance assembly itself may include a number of gear assemblies comprising a large gear in mechanical connection with a small gear via a belt. In some embodiments, the resistance applied to the pedal assembly/arm exercise unit is adjusted by utilizing a gear assembly having a different gear ratio or an adjustable friction or other known resistance source, which will either increase or decrease the resistance of the exercise device. In some embodiments, the resistance assembly may include one or more sets of magnets implemented to provide additional resistance without adding much weight to the exercise device.

The exercise device is securely attached to the footrest of a hospital bed via a clamp assembly. The clamp assembly includes at least two pressure plates that define a space therebetween. When placed, the footrest of the hospital bed is between the pressure plates of the clamp assembly of the exercise device. The pressure plates can then be closed, creating a secure connection between the exercise device and the hospital bed.

The exercise device includes an adjustment assembly that is connected to the frame of the device at one end and the clamp assembly at the other. The device may include an additional component which contacts the bed surface for additional stability. The adjustment assembly is configured to alter the position of the frame on the hospital bed relative to the clamp assembly/footrest, allowing for customized positioning based on patient needs.

FIG. 1 is a front perspective view of an embodiment of an exercise device 100. The exercise device 100 is a small, portable machine configured to temporarily or permanently secure to a hospital bed, for example by being secured to the footrest of the hospital bed. The exercise device 100 comprises a frame 110 made of a plurality of sidewalls that house a resistance assembly (not illustrated) configured to provide varying degrees of exercise difficulty by increasing or decreasing the torque required to rotate pedal assembly 140. The exercise device 100 further includes a position adjustment assembly 120 attached on a first end to one or more of the sidewalls of frame 110. The adjustment assembly 120 is configured to alter the relative position of the frame 110 relative to the point-of-attachment for exercise device 100 (i.e., the footrest of the bed). The adjustment assembly 120 is selectively lockable via knob 121 once the desired position is found. In some embodiments, the adjustment assembly 120 and its locking via knob 121 may also be automated via the software programmed into the device and its paired application, powered by a series of motors which communicate with an application interface, and may be operated by a patient, healthcare provider, or family member via a WiFi or Bluetooth® connection.

The exercise device 100 includes a clamp assembly 130 attached to a second end of the adjustment assembly 120. The clamp assembly 130 is configured to secure the exercise device 100 to the hospital bed. In the embodiment shown in FIG. 1, the clamp assembly comprises a plurality of pressure plates that are adjustable between a closed configuration and an open configuration via knob 131. In the open configuration, the exercise device 100 can be placed on a hospital bed with the footrest of the bed being placed between the pressure plates. Utilizing knob 131, the pressure plates can be adjusted to the closed configuration, providing a tight grip on the footrest of the hospital bed and properly placing the exercise device 100 on the hospital bed for use by a patient. Not shown, but contemplated is the potential for different molds, surfaces or spacers to be attached to, interchangeable with or otherwise positional between the pressure plates of the clamp assembly 130 to customize, allow for or improve the fit with a given hospital bed. In some embodiments, configuration of the position plates in the clamp assembly 130 via knob 131 may also be automated via the software programmed into the device and its paired application, powered by a series of motors which communicate with an application interface, and may be operated by a patient, healthcare provider, or family member via a WiFi or Bluetooth® connection.

The exercise device also includes pedal assembly 140, comprising two pedals extending from opposing sidewalls of frame 110 via crank arms. The crank arms are attached to the resistance assembly housed within the frame 110.

Importantly, the exercise device 100 and its components may be made of, or may be coated in, anti-microbial materials to prevent the possibility of spreading viruses, bacteria, and diseases between patients that utilize the same exercise device 100.

Figure 2:
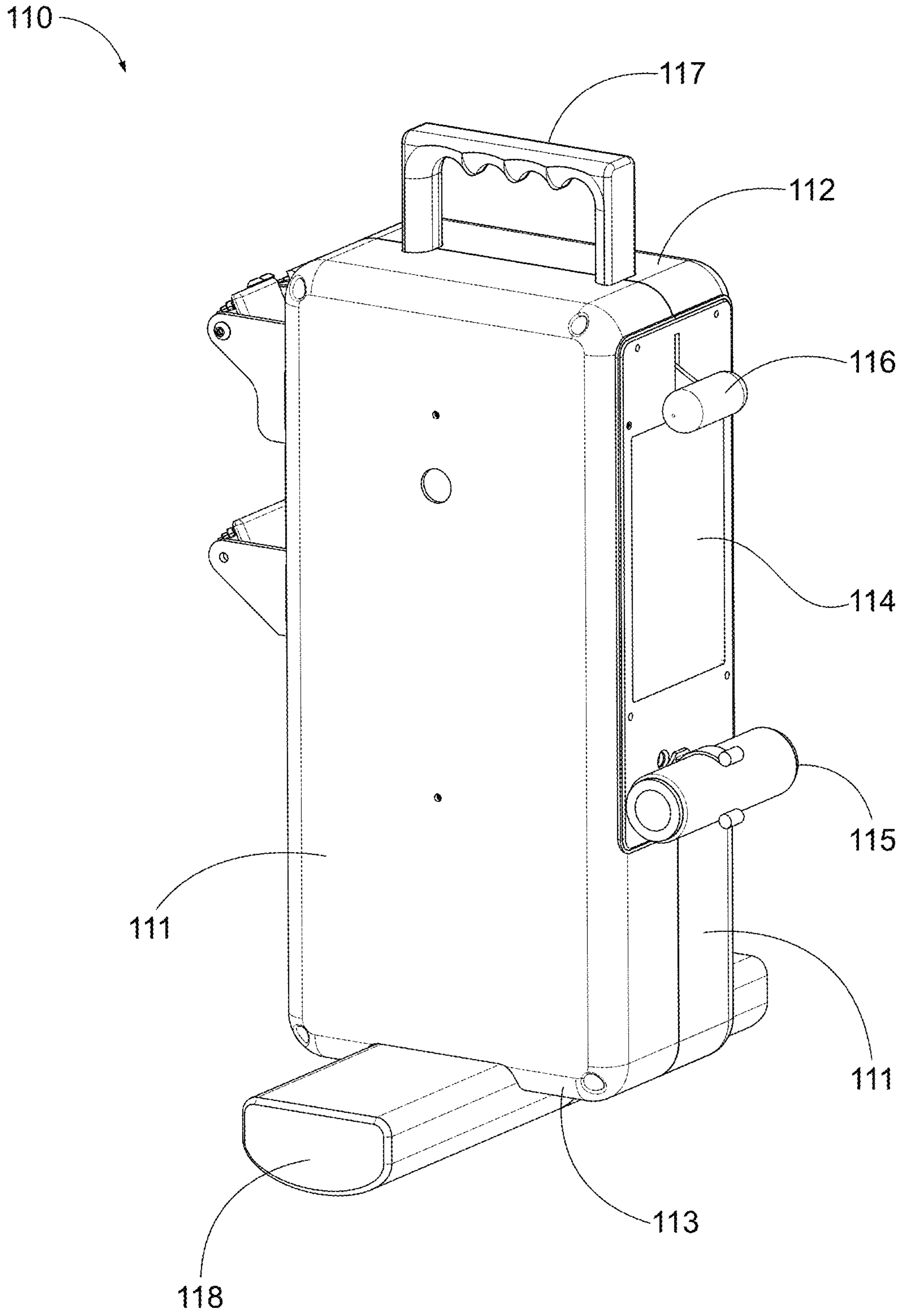
FIG. 2 is a front perspective view of an embodiment of a frame of the exercise device of FIG. 1.

FIG. 2 is a front perspective view of an embodiment of a frame 110. As shown, the frame 110 includes sidewalls 111, a top surface 112, and a bottom surface 113. The sidewalls 111 define a case/housing that houses multiple components of the exercise device 100, as discussed in detail below (for example, the resistance assembly, electrical components, etc.). In some embodiments, the frame 110 includes a user interface 114 embedded within a portion of sidewalls 111. The user interface 114 can be used to display exercise metrics, such as resistance of the machine, distance pedaled, speed, etc. The user interface 114 can also be used to adjust settings of the exercise device 100, including resistance of rotating the pedals of pedal assembly 140. Further, the user interface 114 may be programmed to display interactive media to the patient, such as user applications, games, alerts/reminders, or other visual aids designed to encourage and motivate the patient during exercise.

In some embodiments, the exercise device 100 further includes an arm exercise unit 115. In such embodiments, the arm exercise unit 115 comprises a handle connected to a pulley or resistance band, which (like the pedal assembly 140), may connected to the same resistance assembly housed within frame 110 or another resistance assembly, such as an elastic band or the like. Thus, the arm exercise unit 115 allows for the patient to perform arm exercises to strengthen upper-body muscles, while the pedal assembly 140 allows the patient to exercise their lower-body. In embodiments of exercise device 100 that include both a pedal assembly 140 and an arm exercise unit 115, the patient may use both forms of exercise separately or simultaneously. Further, in these forms the user interface 114 may be configured to display exercise metrics of both the pedal assembly 140 and the arm exercise unit 115 both separately and simultaneously.

In some embodiments, the frame 110 further includes a resistance control knob 116. The resistance control knob 116 allows the patient or a healthcare provider to alter the resistance provided by the resistance assembly to either increase or decrease the resistance required to move (i.e., rotate or pull) the pedal assembly 140 or the arm exercise unit 115, respectively. In some embodiments, the frame 110 may include a separate resistance control knob 116 for the pedal assembly 140 and a separate resistance control knob for the arm exercise unit 115. In yet other embodiments, the resistance of the resistance assembly may be altered by the resistance control knob 116, the user interface 114, or remotely either by the patient (via an app) or by the healthcare provider (discussed in more detail below).

In the embodiment shown, the frame 110 includes a handle 117 attached to the top wall 112. The handle 117 may be attached to the top surface 112 of sidewalls 111. Optionally, the bottom surface 113 includes a base 118, configured to stabilize the exercise device 100 on the hospital bed. The base 118 provides vertical and lateral support for the exercise device 100 during use. Optionally, the base 118 may be made of a material that provides a high amount of friction with the bedding of the hospital bed, or even connects to the bed, such as through a mechanical connection, hook and loop connection to the sheets, or the like, thereby providing more support and reducing or some embodiments eliminating the chance that the exercise device 100 will slip or slide during patient use.

As mentioned above, the frame 110 may house a number of components internally, such as the resistance assembly (discussed in more detail with reference to FIGS. 4 and 5). In some embodiments, the exercise device 100 includes an internal battery or other power-source housed within frame 110. The battery is rechargeable, optionally via external cabling or solar power. However, in some embodiments, the battery relies either completely or partially on power generated by the patient's use of the exercise device 100. When a patient utilizes the pedal assembly 140 or the arm exercise unit 115, the movement of the resistance assembly generates power, which, in this embodiment, can be transferred and stored within the battery. In this manner, once assembled, the exercise device 100 relies entirely or at least in part on self-generated power. The battery may be used to power any electrical components contained within frame 110/exercise device 100.

In some embodiments, the frame 110 may also house a wireless communication module in electrical connection with the battery/power source. The wireless communication module may be configured to transmit exercise metrics of the patient across an available network, such as a hospital network. In some embodiments, the wireless communication module may transmit data and information to an application accessible by the patient. Further, the wireless communication module may transmit data and information directly to the patient's healthcare provider. The data set by the wireless communication module may be integrated directly with the healthcare provider's electronic medical record (ERM) system. The wireless communication module may also receive data/instructions/etc. from either the application accessible by the user or from the healthcare provider. In this manner, the wireless communication module can direct the exercise device 100 in certain aspects. For example, instructions can be sent directly to exercise device 100 to update, modify, begin, or end a patient's exercise regimen. Alternatively, a patient can change system settings (resistance, etc.) utilizing the mobile application or interface, or the settings may be manually adjusted by the patient or hospital personnel, or may be automatically adjusted by the device's software as part of a pre-programmed routine. Transmitted information may include activity logs and routines, exercise metrics, training intervals, device positioning (e.g., positioning of the adjustment assembly 120), etc. The wireless communication module is designed not to interfere with medical equipment including but not limited to pacemakers, defibrillators, and telemetry.

In some embodiments, the exercise device 100 may include a memory housed within frame 110. The memory can be used to save received/transmitted information relayed by the wireless communication device. In other embodiments, the data relayed by the wireless communication device may be stored remotely on separate servers.

The exercise device 100 is also configured to operate with a number of wireless accessories. The accessories may be connected to the exercise device 100 via any suitable wireless communication means, such as WiFi or Bluetooth®. For example, in some embodiments, the exercise device 100 may connect to various biometric sensors used to collect patient health data, such as blood oxygen levels, heart rate, temperature, etc. or patient identifying data, such as a unique ID associated with a patient or a barcode, bracelet or token worn by the patient. Patient health data captured by the biometric sensors may be received and re-transmitted to the patient's mobile application or the healthcare provider's EMR system via the wireless communication module. Similarly, the exercise device 100 may also be wirelessly tethered to augmented reality (AR) or virtual reality (VR) devices utilized to enhance a patient's exercise experience. The wireless adaptability of the exercise device 100 will be appreciated by those of skill in the art.

Figure 3:
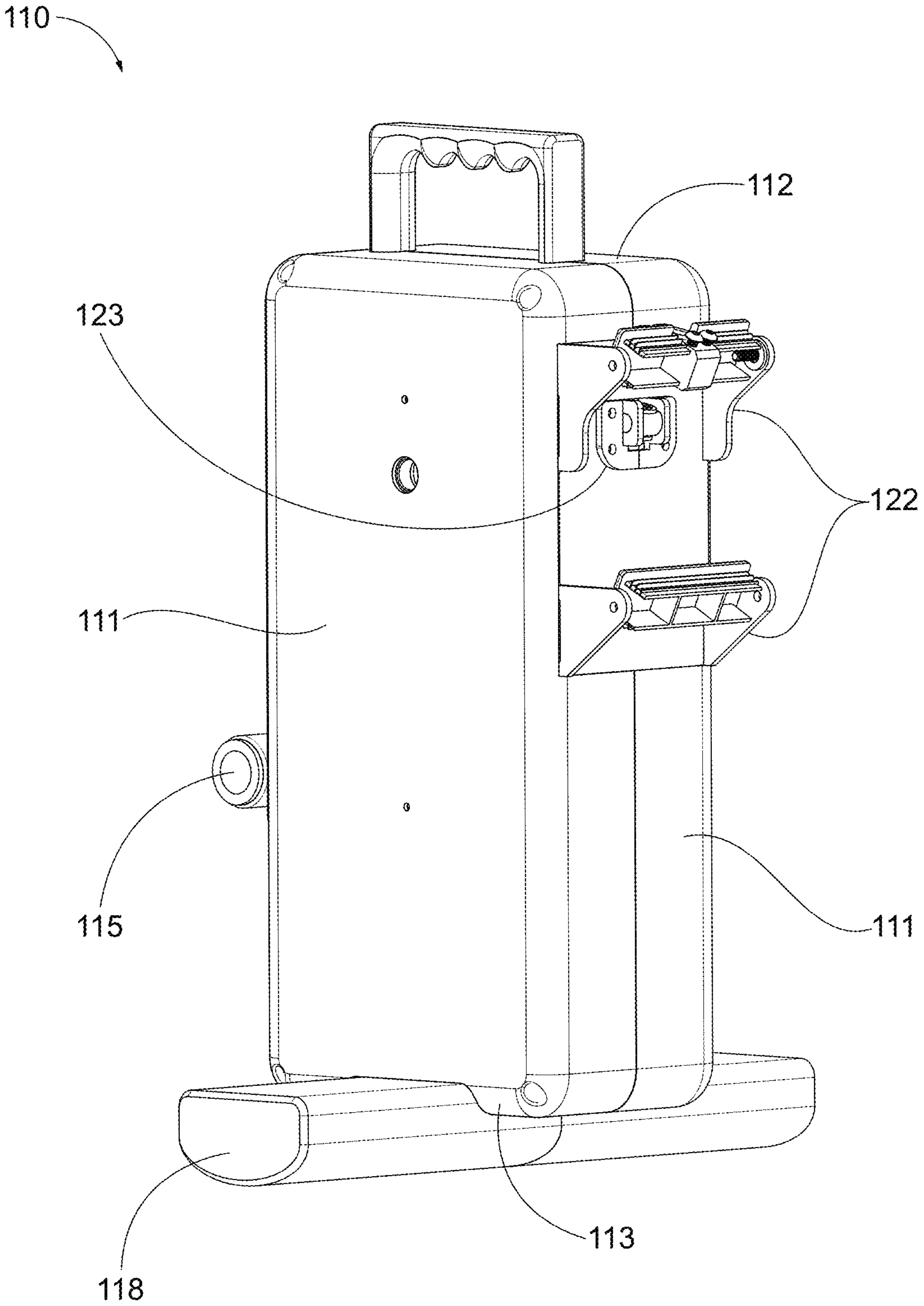
FIG. 3 is a rear perspective view of the frame of FIG. 2.

FIG. 3 is a rear perspective view of the frame 110 of FIG. 2. As shown, the exercise device 100 includes a set of brackets 122 secured to the sidewalls 111 of frame 110 configured to receive and secure the adjustment assembly 120 thereto. In addition, a handle is provided for ease of transport and adjustment. The sidewalls 111 also include a receptacle 123 configured to receive a Kant Twist screw (discussed in more detail with reference to FIGS. 6-10).

Figure 4:
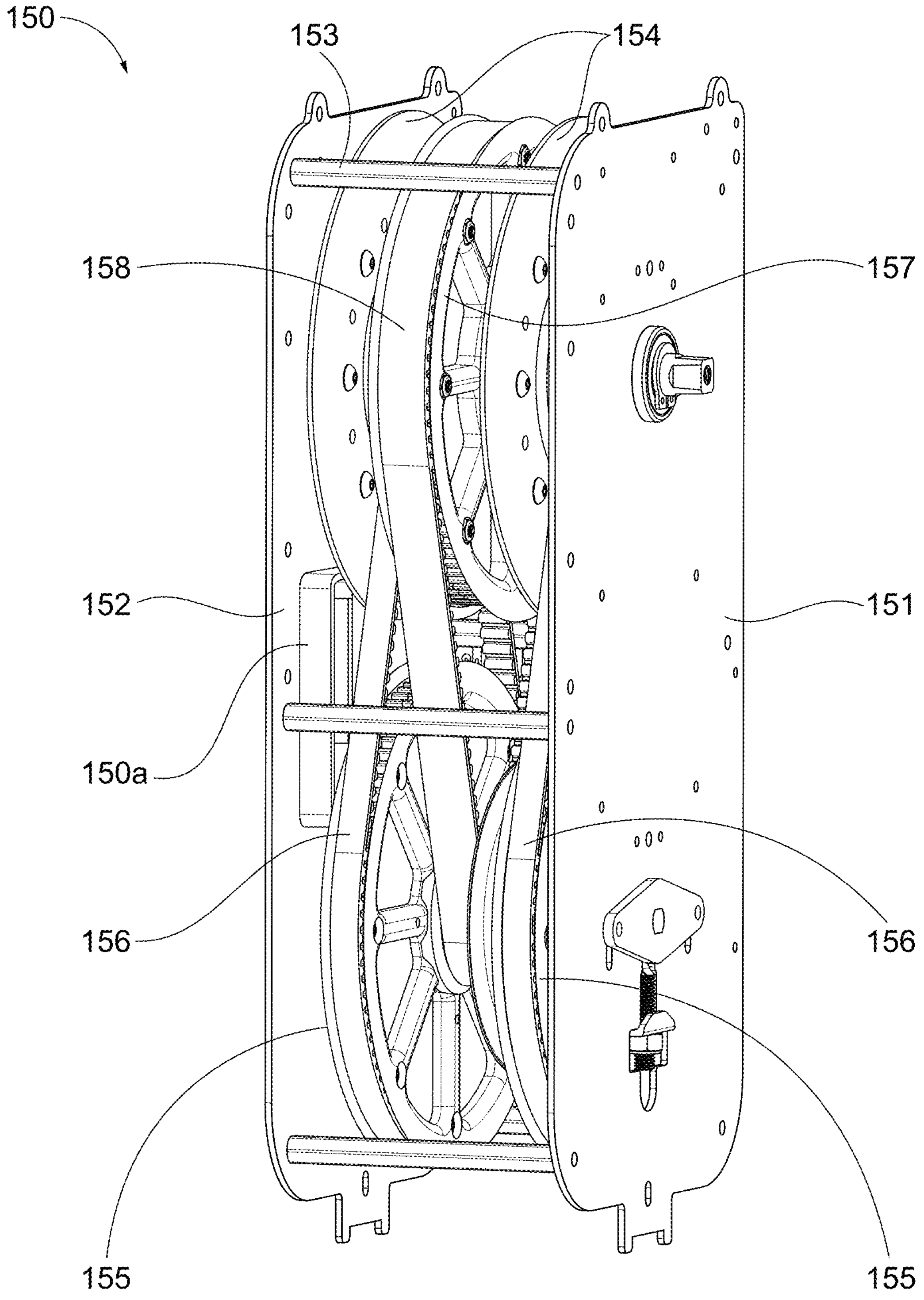
FIG. 4 is a front perspective view of an embodiment of a resistance assembly.
Figure 5:
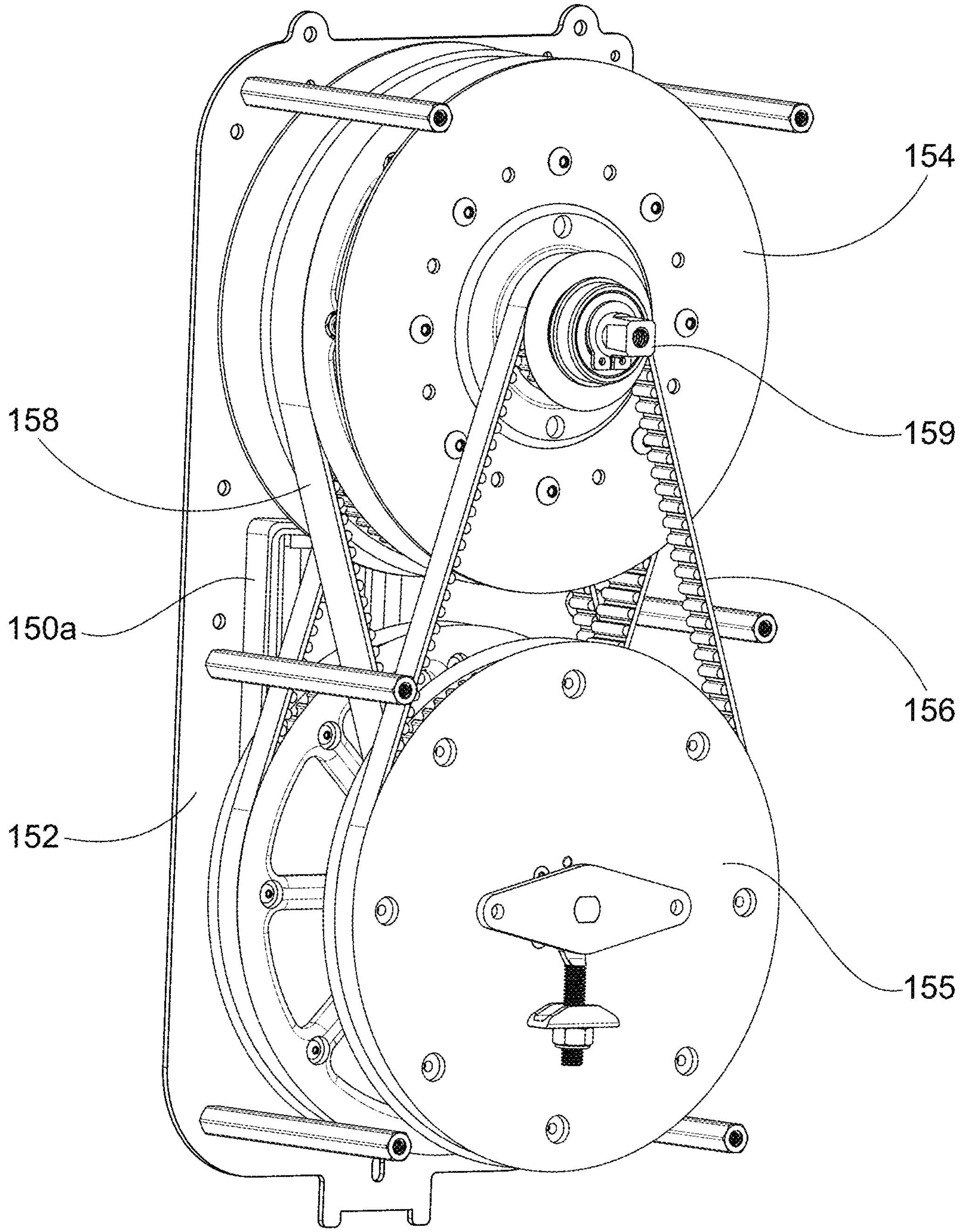
FIG. 5 is a cross-sectional side view of the resistance assembly of FIG. 5.

FIGS. 4 and 5 illustrate an embodiment of a resistance assembly 150 according to the present disclosure. As shown, the resistance assembly 150 is situated between plates 151, 152, which are secured to the inner surface of sidewalls 111 of frame 110. The plates 151, 152 may optionally be secured together via spacers 153. In this embodiment, the resistance assembly 150 comprises two spinning flywheels 154 in mechanical connection with timing pulleys 155 connected via belts 156. The resistance assembly 150 further includes a drive pulley 157 connected via belt 158 to one of the pulleys 155. The drive pulley 157 and spinning flywheels 154 are stacked together along pin 159, which services as a connection point for pedal assembly 140. Further, the arm exercise unit 115 is connected via a resistance band to one of pulleys 155.

The spinning flywheels 154 comprise a smaller diameter portion defining teeth for attachment of belt 156 and a larger diameter portion defining a base. In some embodiments, the base includes a thin layer of alloy attached thereto made of, for example, copper. The copper plate contributes to the devices' effective magnetic resistance. Further, the base includes one or more magnets housed within bores in the base. By adjusting the proximity of the one or more magnets, the resistance of the resistance assembly can be adjusted.

The timing pulleys 155 are configured to act as a speed enhancement mechanism, thereby increasing the pedaling speed of pedal assembly 140. For example, the pulleys 155 may include approximately 90 teeth, while the flywheels 154 may include 24 teeth, creating, for example, two 3.75:1 ratio pulleys, which cumulatively provide a 14:1 pedaling speed to flywheel speed ratio. Adjusting this ratio allows for the pedal assembly 140 to be pedaled at or near a normal bike pedaling speed (~90 rpms) while still controlling the resistance of the exercise device 100. Further, while a 14:1 ratio is provided as a non-limiting example, other ratios may be chosen by altering the number of teeth on the timing pulleys 155 versus the number of teeth on the flywheels 154.

Figure 6:
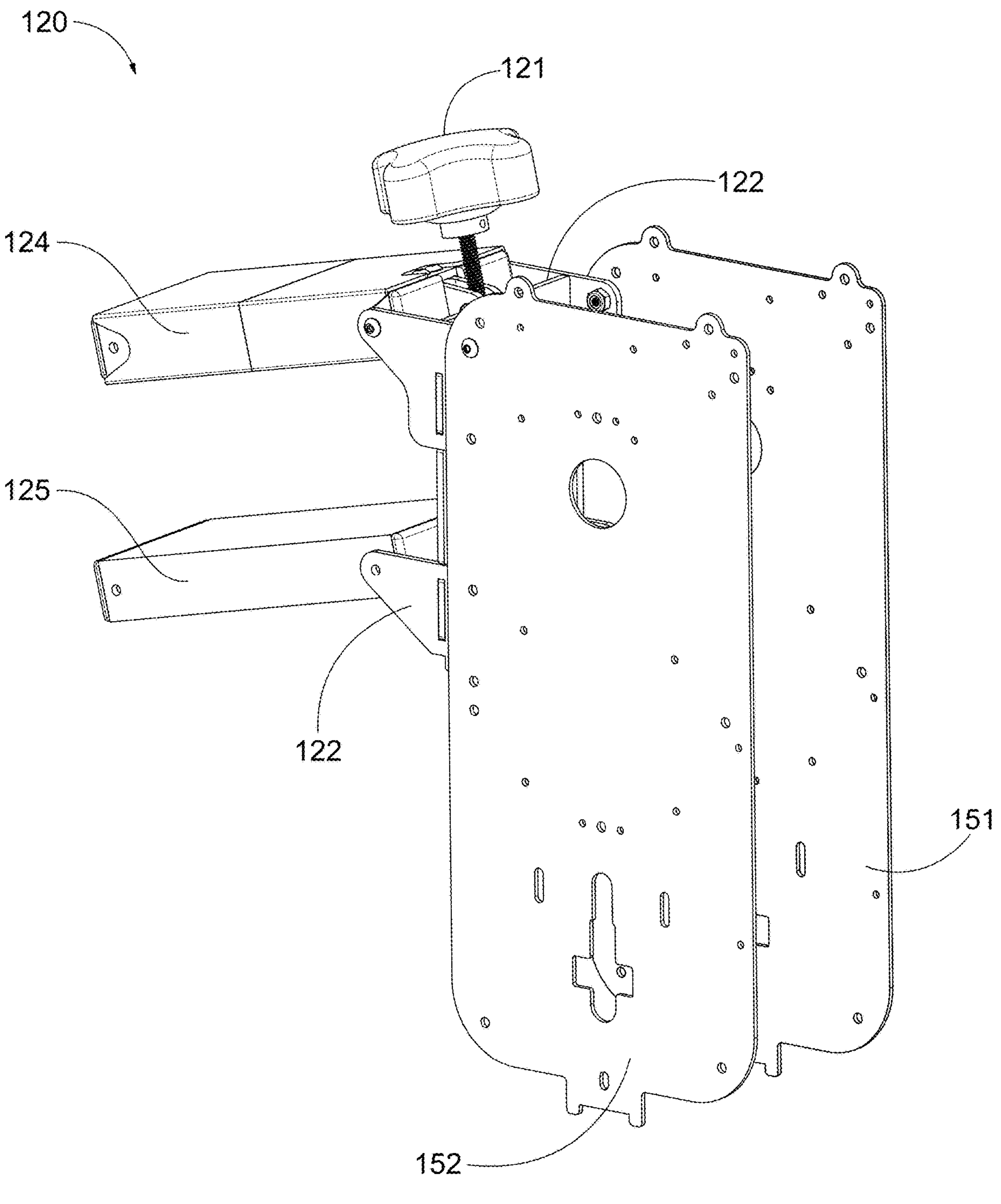
FIG. 6 is a side perspective view of an embodiment of an adjustment assembly.
Figure 7:
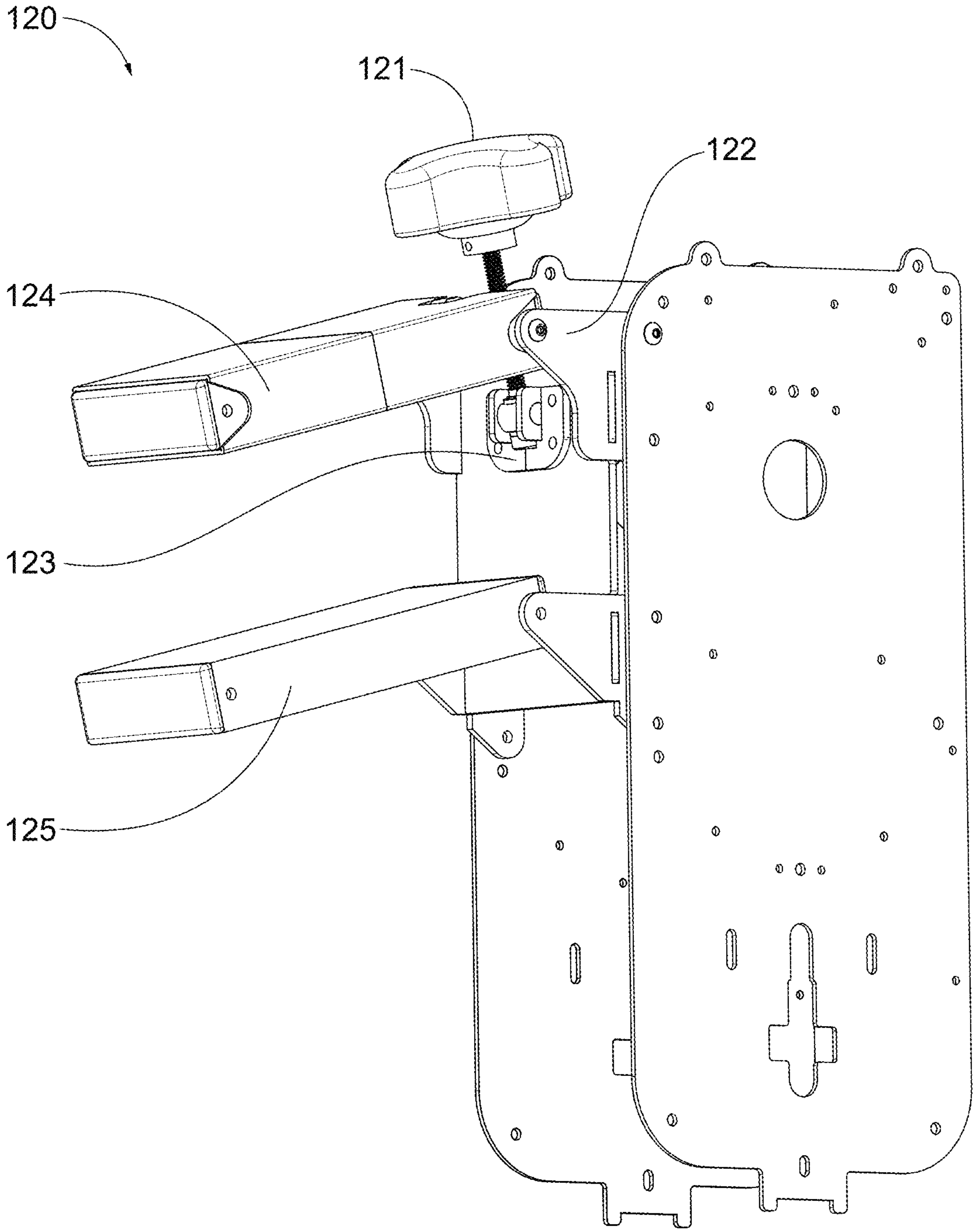
FIG. 7 is a rear perspective view of the adjustment assembly of FIG. 6.
Figure 8:
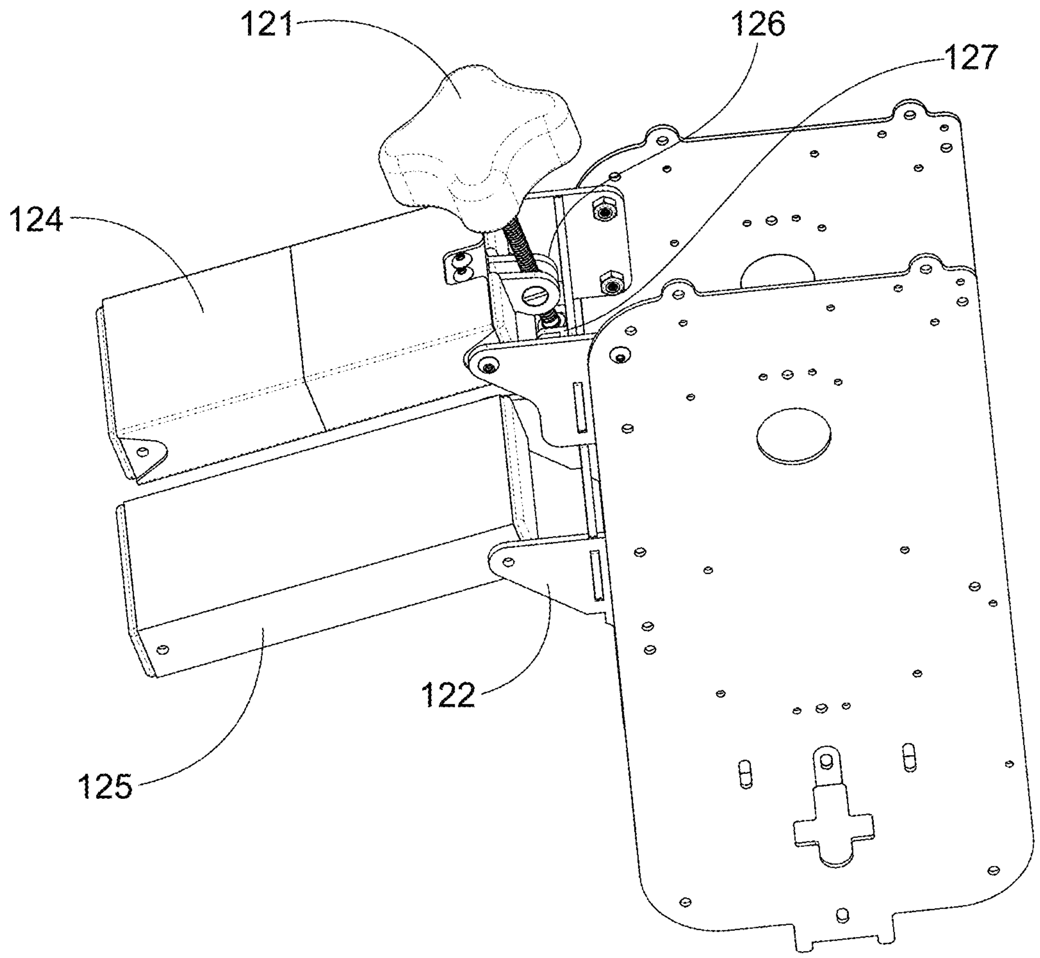
FIG. 8 is a top perspective view of the adjustment assembly of FIG. 6.
Figure 9:
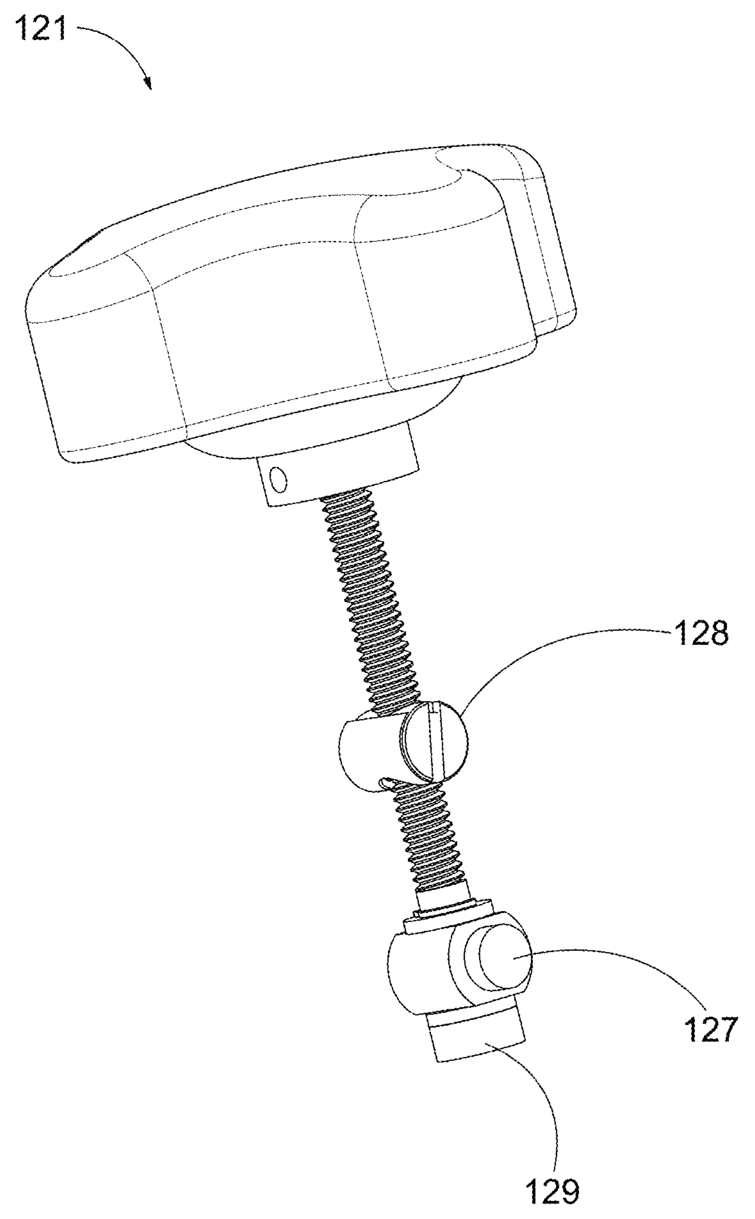
FIG. 9 is a side view of a screw of an embodiment of the adjustment assembly.
Figure 10:
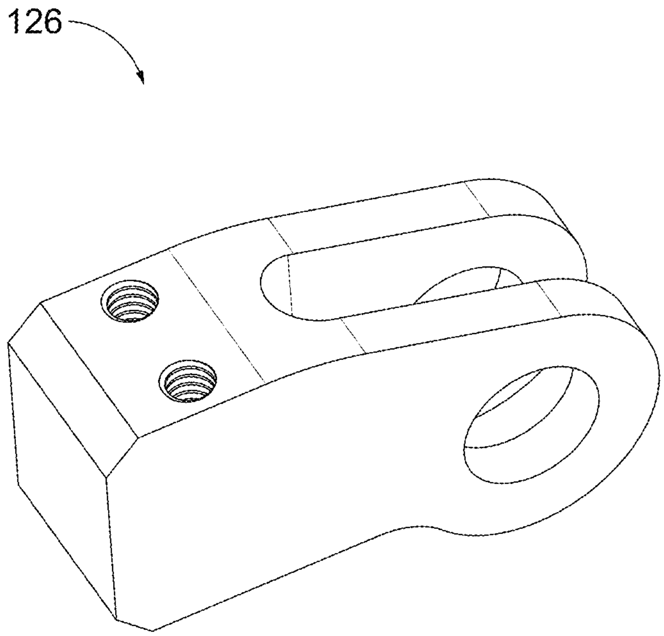
FIG. 10 is a side perspective view of a screw pin of an embodiment of the adjustment assembly.

FIG. 6 is a side perspective view of an embodiment of an adjustment assembly 120. In this embodiment, the adjustment assembly comprises the Kant Twist clamp 121, the brackets 122, the receptable 123, top adjustment arm/top arm 124, bottom adjustment arm/bottom arm 125, pin 126, and plates 151, 152. Plates 151, 152 are secured to the inner surface of sidewalls 111 of frame 110 and provide attachment points for brackets 122. In other embodiments, brackets 122 are directly attached to sidewalls 111.

The Kant Twist clamp 121 adjusts the relative position (i.e., angle) between the frame 110 and the clamp assembly 130, allowing healthcare providers to properly position the exercise device 100 to a patient's specific size and anatomy. Specifically, the Kant Twist clamp 121 includes a bearing pin 127 located at the terminal end 129 of the screw 121, which is secured within the receptable 123 attached to frame 110. The screw 121 further includes an arm screw 128, which is housed within pin 126 (see FIGS. 9-10). Further, pin 126 is securely fastened to top arm 124. During rotation of clamp 121, the bearing pin 127 remains fastened within receptable 123, while the location of arm screw 128 moves vertically along screw 121. Movement of arm screw 128 along screw 121 alters the position of the top arm 124 and adjusts the top arm 124 and bottom arm 125 at either a more horizontal orientation or a more vertical orientation, which alters the angle between the frame 110 and the clamp assembly 130 (and therefore the footrest of the hospital bed). In some embodiments, the movement of arm screw 128 along screw 121 may also be automated via the software programmed into the device and its paired application, powered by a series of motors which communicate with an application interface, and may be operated by a patient, healthcare provider, or family member via a WiFi or Bluetooth® connection.

In some embodiments, top arm 124 and bottom arm 125 may be comprised of a multiple sleeve pieces. For example, both top arm 124 and bottom arm 125 may each include two pieces defining the body of the arms 124, 125. In this embodiment, one sleeve piece of arms 124, 125 may slide telescopically relative to the other sleeve piece of the respective arms 124, 125. Thus, the adjustment assembly may also provide for additional retraction/extension between the frame 110 and the clamp assembly 130 of the exercise device 100. This allows for an additional degree of adjustment to account for patients of various needs and sizes.

Figure 11:
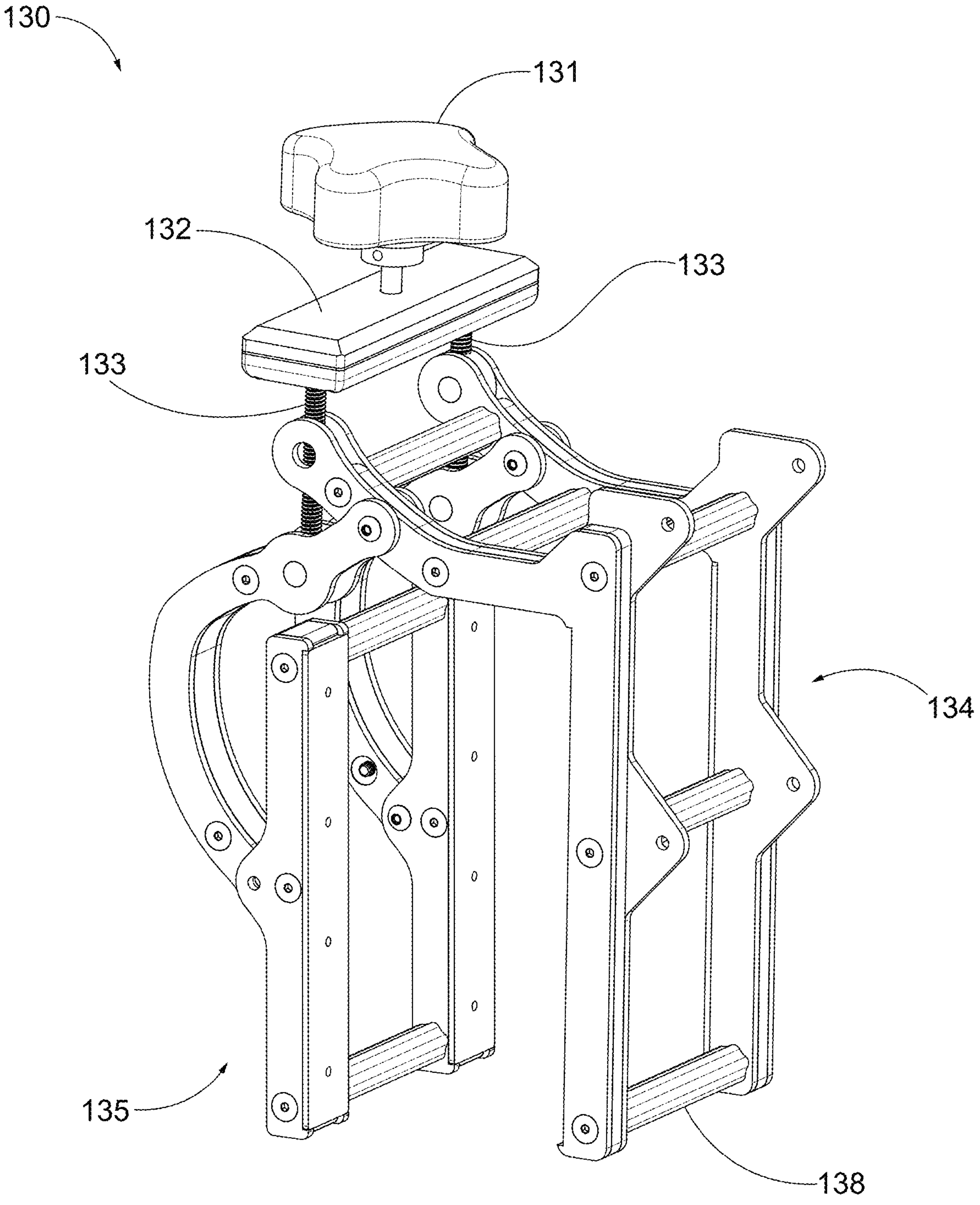
FIG. 11 is a side perspective view of an embodiment of a clamp assembly.

FIG. 11 is a side perspective view of an embodiment of a clamp assembly 130. In this embodiment, the clamp assembly 130 includes a knob 131 and a screw assembly 132 attached to set screws 133, and pressure plates 134 and 135. The clamp assembly 130 is adjustable between an open configuration and a closed configuration defined by the relative position of the first pressure plate 134 relative to the second pressure plate 135. The position of the first pressure plate 134 relative to the second pressure plate 135 is adjustable via knob 131 and screw assembly 132. Rotating the knob 131 in a first direction moves pressure plate 134 away from pressure plate 135 orienting the clamp assembly 130 in an open configuration. Conversely, rotating the knob 131 in a second direction moves pressure plate 134 towards pressure plate 135 orienting the clamp assembly in a closed configuration. In some embodiments, the movement of pressure plate 134 toward pressure plate 135 may also be automated via the software programmed into the device and its paired application, powered by a series of motors which communicate with an application interface, and may be operated by a patient, healthcare provider, or family member via a WiFi or Bluetooth® connection.

In the open configuration, the clamp assembly 130 and therefore the exercise device 100 can be placed such that the footrest (or other fixture) can be placed between the pressure plates 134, 135. The closed configuration is achieved when the pressure plates 134, 135 are oriented such that the footrest of the hospital bed is securely fastened therebetween, thus securely attaching the exercise device 100 to the hospital bed.

Figure 12:
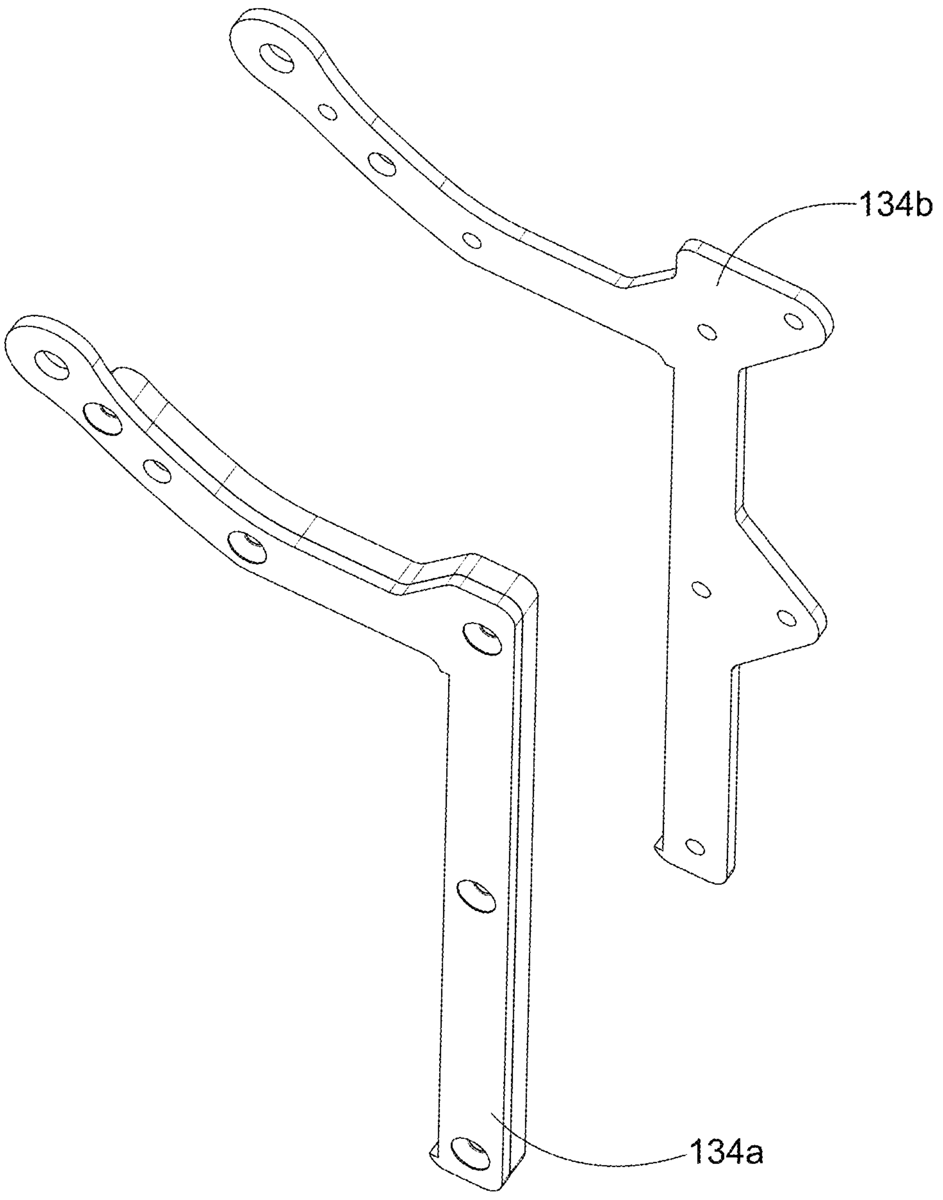
FIG. 12 is an exploded view of an arm assembly of a pressure plate of the clamp assembly.

As shown in FIG. 12, the pressure plates 134, 135 comprise a number of clamp bodies. FIG. 12 is a semi-exploded view of the clamp bodies 134*a*, 134*b* that make up one arm of pressure plate 134. In this embodiment, one clamp body 134*a* includes a protrusion while the other clamp body 134*b* is relatively flat. When clamp bodies 134*a*, 134*b* are securely fastened together, there is a cavity defined therebetween configured to receive one set screws 133. The other arm of pressure plate 134 is similarly configured. Further, the clamp bodies of pressure plate 135 have a similar construction with the cavities configured to receive a portion of the arms of pressure plate 134, as shown in FIG. 11. In other embodiments, the pressure plates 134, 135 are comprised on unitary pieces of material.

The clamp assembly 130 further includes horizontal spacers 138. The spacers 138 secure one arm of the pressure plate to the other arm, while also serving as a point of contact when the exercise device 100 is connected to the hospital bed. The spacers 138 may be made of, or alternatively may be covered with, a material with a high friction coefficient, such as rubber or polyurethane. This allows the spacers to also provide additional friction between the exercise device 100 and the hospital bed to prevent slippage during use.

In some embodiments, the clamp assembly 130 includes pressure sensors configured to determine whether or not the clamp assembly 130 is securely fastened to the hospital bed. In the event a bad connection is detected (e.g., not uniform pressure), the exercise device 100 may alert the healthcare provider and/or patient by an alert sent via the wireless communication module. This allows the patient and/or healthcare provider to adjust the clamp assembly to ensure a stable connection with the hospital bed, either manually or remotely via communications received by the wireless communication module. In some embodiments, the exercise device 100 may be configured to automatically adjust the clamp assembly in the event the clamp assembly 130 is not securely attached to the hospital bed.

Figure 13:
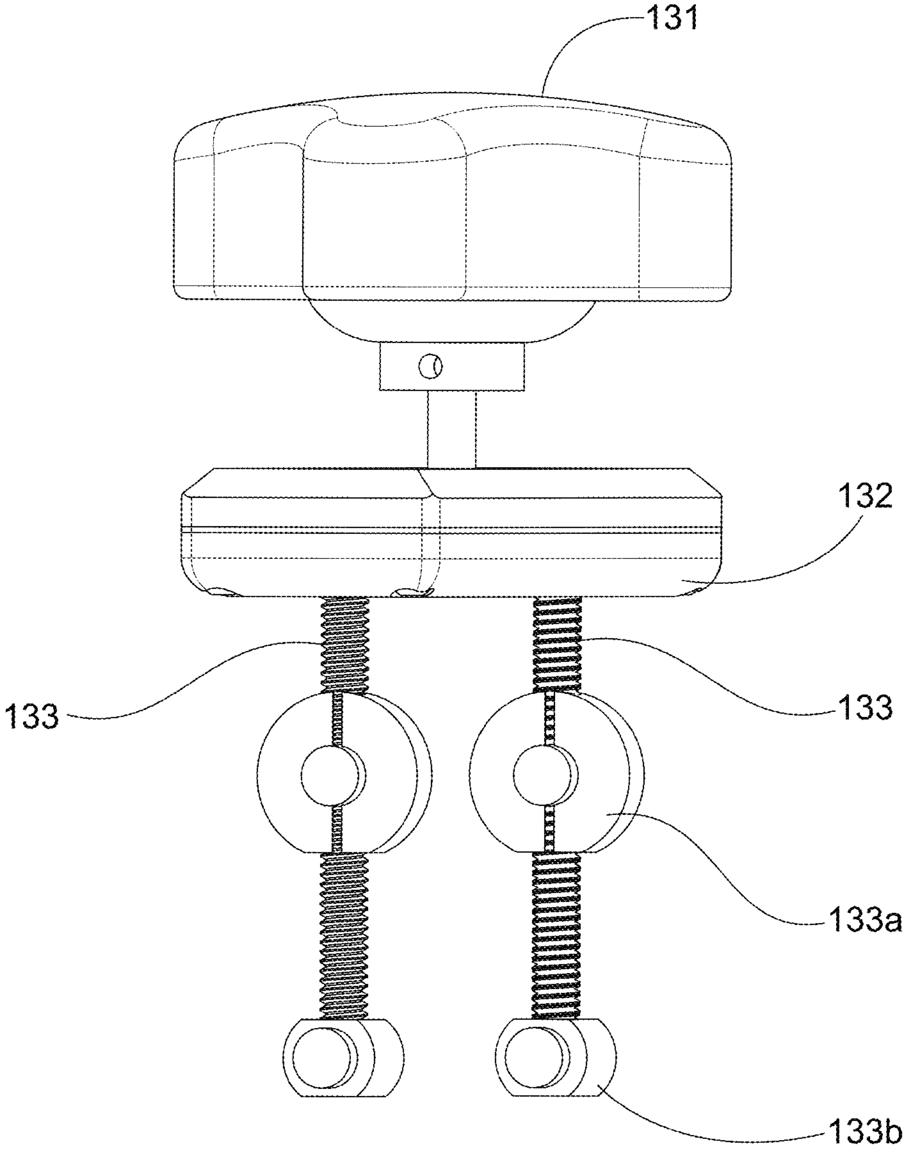
FIG. 13 is a side view of a screw assembly of the clamp assembly.
Figure 14:
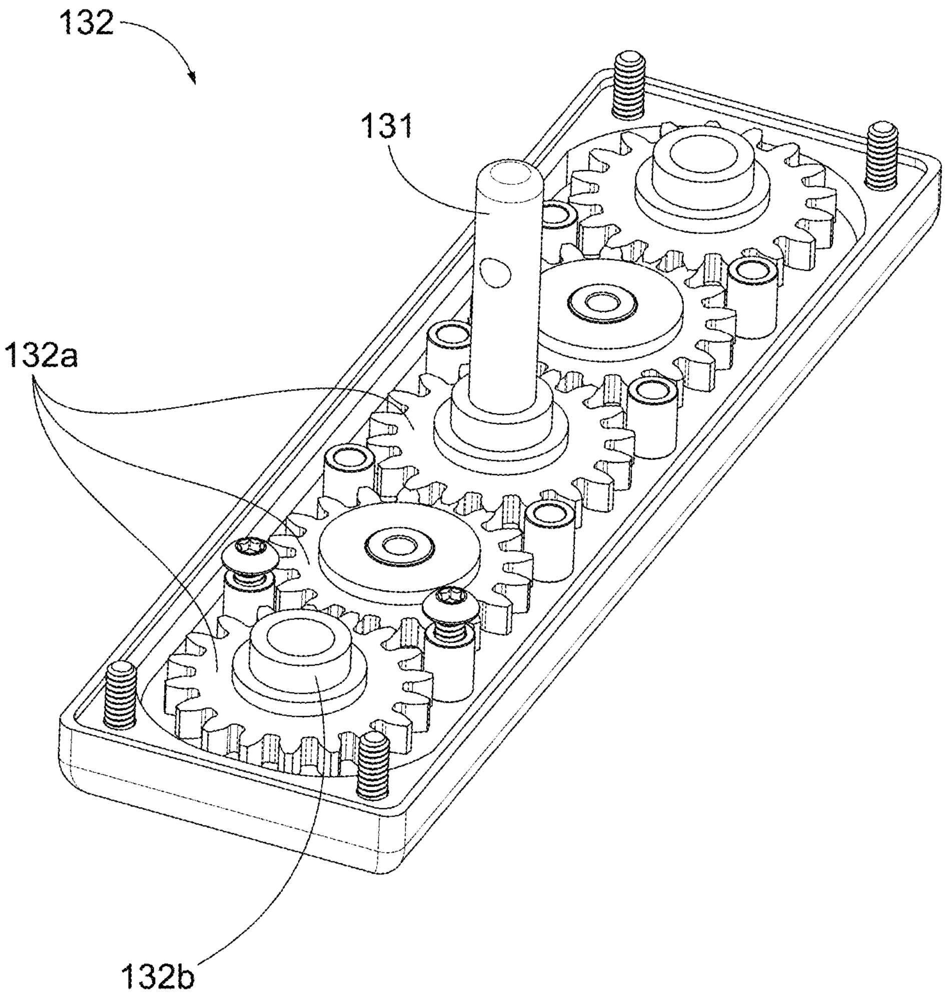
FIG. 14 is a cross-sectional view of the screw assembly of FIG. 13.

FIG. 13 is a side view of a knob 131 and screw assembly 132 of the clamp assembly 130. As shown, each of the set screws 133 includes a top pin 133*a* and a bearing 133*b*, with the bearing 133*b* being securely fastened at the end of the respective set screw 133. As seen in FIG. 14, when the knob is turned in a first direction, a set of gears 132*a*, 132*b* within screw assembly 132 are simultaneously rotated in the same direction. This rotation causes set screws 133 to also rotate via their connection with gear 132*b*. Rotation of set screws 133 in turn cause pins 133*a* to move, either up or down, along the length of the set screws 133. This causes pressure plates 134, 135 to adjust between their open configuration and closed configuration, as the pressure plate 134 is attached to the pins 133*a*. Thus, movement of pins 133*a* via knob 131 causes pressure plate 134 to move, while pressure plate 135 remains stationary, as pressure plate 135 is attached to bearings 133*b*. While this embodiment of clamp assembly 130 has been described herein, it should be appreciated that other modes of securing the exercise device 100 to the hospital bed are envisioned within the scope of the present disclosure.

Figure 15:
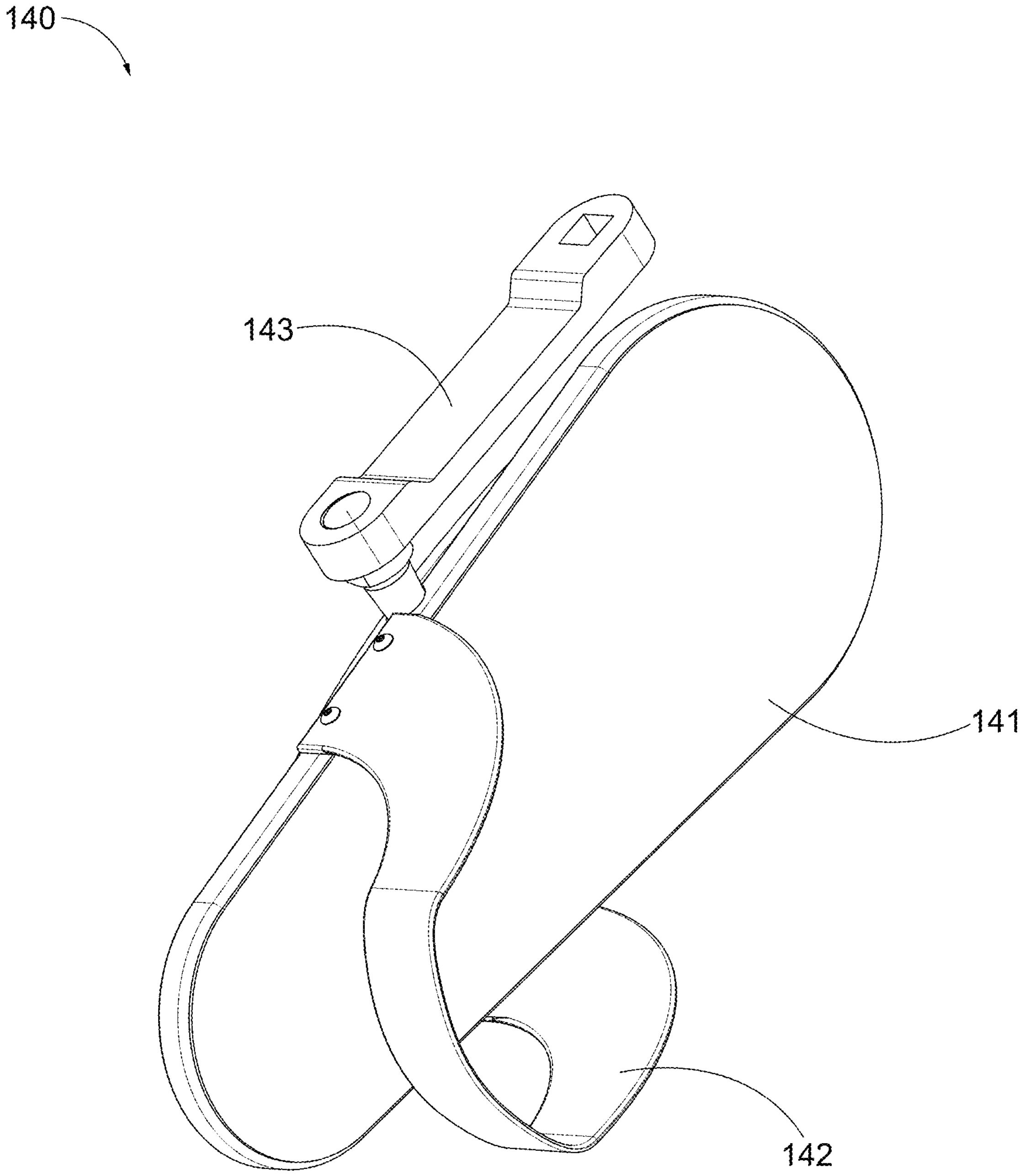
FIG. 15 is a perspective view of an embodiment of a pedal assembly.

FIG. 15 is a perspective view of an embodiment of a pedal assembly 140. The pedal assembly 140 includes the pedal/footrest 141, a heel support 142, and a crank arm 143. The pedal 141 may optionally include a layer of padding to increase patient comfort during exercise. In some embodiments, the heel support 142 is made of a hard material, such as plastic, in the event a patient exercises with shoes on. In other embodiments, the heel support 142 may comprise a softer material or a strap. The crank arm 143 attaches to pedal 141 and the frame 110. Specifically, the crank arm 143 attaches to the resistance assembly 150 housed within frame 110, allowing the patient to pedal against the resistance provided by resistance assembly 150.

Figure 16:
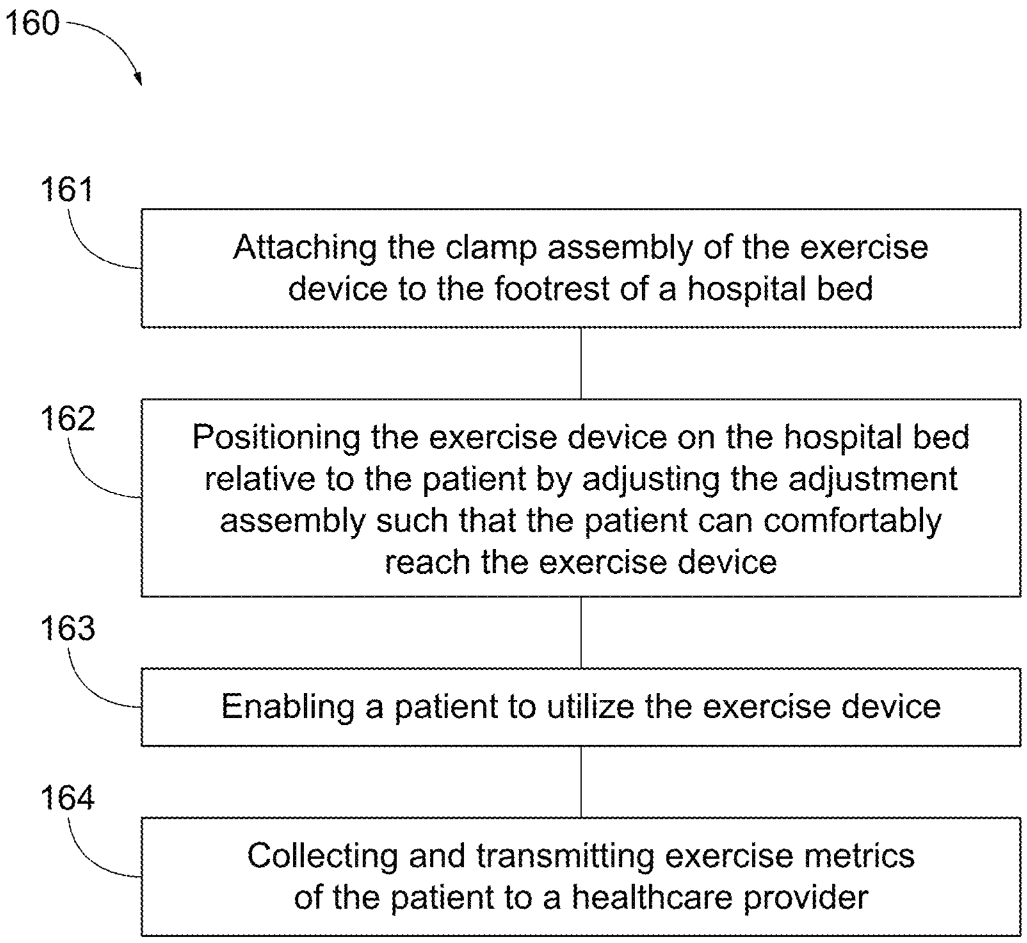
FIG. 16 is a box diagram of a method of collecting and tracking patient mobility data.

FIG. 16 is a box diagram of a method 160 of collecting and tracking patient mobility data utilizing the embodiments of exercise device 100 described in detail, above. At 161, the exercise device is attached to a patient's hospital bed. As mentioned above, this is achieved in one embodiment by placing the footrest between the pressure plates 134, 135 of clamp assembly 130 and tightening the clamp assembly 130 to achieve a secure attachment. At 162, the exercise device 100 is then positioned on the hospital bed at a position relative to the patient, depending on the patient's height and anatomy, such that the patient can utilize the pedal assembly 140 and/or the arm exercise unit 115 of the exercise device 100. The patient then utilizes the exercise device 100 as desired or as instructed by a healthcare provider (i.e., an exercise regimen prescribed as part of the patient's recovery/ rehabilitation). At 164, the exercise device 100 is configured to collect and transmit the exercise metrics of the patient, such as duration, resistance, and other exercise data that a healthcare provider can review to assess patient health. The exercise data can be integrated into the healthcare provider's EMR system, allowing the healthcare provider to track the patient's exercise and progress. Reviewing this data will allow healthcare providers to assess patient conditions and mobility health, allowing the healthcare provider to alter exercise regimens, as needed.

As mentioned above, the exercise device 100 may connect to biometric sensors. The method disclosed herein allows healthcare providers to also collect and track patient health data comprising health data obtained by the biometric sensors wirelessly connected to exercise device 100. By tracking both a patient's exercise metrics and health data, healthcare providers are equipped with a more complete picture of the patient's mobility and their overall health.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. An exercise device, comprising:

a frame comprising a plurality of sidewalls, said plurality of sidewalls defining an interior that houses a resistance assembly;

the resistance assembly comprising one or more assemblies configured to provide varying levels of resistance for the exercise device;

a clamp assembly comprising a set of pressure plates adjustable between an open configuration and a closed configuration, wherein the clamp is configured to secure the exercise device to a hospital bed when in the closed configuration;

an adjustment assembly comprising a first end and a second end, wherein the first end is connected to the frame and the second end is connected to the clamp assembly, the adjustment assembly configured to alter the position of the frame relative to the clamp assembly defining various positions of the exercise device relative to a patient; and a pedal assembly comprising two pedals rotatably attached via crank arms on opposing sidewalls of the frame, wherein each pedal is configured to receive a foot of the patient, wherein the crank arms are each respectively attached to the resistance assembly within the frame;

wherein the frame includes a resistance control configured to alter the resistance required to rotate the pedals; and wherein the adjustment assembly is lockable at the various positions.

2. The exercise device of claim 1, wherein the clamp assembly includes pressure sensors integrated in the pressure plates configured to ensure the exercise device is securely connected to the hospital bed.

3. The exercise device of claim 2, wherein the pressure sensors trigger an alert when the pressure plates of the clamp assembly are not fully secured to the hospital bed.

4. The exercise device of claim 1, wherein the frame further includes an arm exercise unit comprising a pulley or resistance band and a handle connected to the resistance assembly within the frame of the exercise device.

5. The exercise device of claim 1, wherein the frame includes a user interface configured to track and display exercise metrics and/or interactive media.

6. The exercise device of claim 5, wherein the frame houses a battery powered by rotation of the pedals preventing the need for an outside battery source.

7. The exercise device of claim 1, wherein the frame houses a wireless communication module configured to transmit exercise metrics.

8. The exercise device of claim 7, wherein the wireless communication module transmits the exercise metrics to a user application accessible by the patient.

9. The exercise device of claim 8, wherein the settings of the exercise device, such as resistance, device positioning, and training intervals, can be adjusted via the user application.

10. The exercise device of claim 7, wherein the wireless communication module transmits the exercise metrics to a healthcare provider, wherein the data can be integrated with the patient's electronic medical record.

11. The exercise device of claim 10, wherein the healthcare provider can adjust settings of the exercise device, such as resistance, device positioning, and training intervals.

12. The exercise device of claim 10, wherein the settings of the exercise device, such as resistance, device positioning, and training intervals may be adjusted automatically via pre-programmed routines on the device.

13. The exercise device of claim 1, wherein the resistance assembly comprises a speed-enhancement assembly configured to increase the rotational speed of the pedals by a ratio of approximately 14:1.

14. The exercise device of claim 13, wherein the speed-enhancement assembly includes at least two sets of timing pulleys and belts connected in series, wherein the timing pulley comprises one 90-tooth pulley and one 24-tooth pulley connected via a belt.

15. The exercise device of claim 1, wherein the device further includes biometric sensors configured to collect and store patient health data.

16. The exercise device of claim 15, wherein the wireless communication module is configured to transmit the patient health data to the user application and/or the healthcare provider.

17. The exercise device of claim 1, wherein the device is configured to interface with augmented reality and/or virtual reality devices.

18. A method of collecting and tracking patient mobility data, the method comprising:

attaching an exercise device to the footrest of a patient's hospital bed by tightening a clamp assembly of the exercise device to the hospital bed, either manually or via a wireless communication module;

positioning the exercise device via an adjustment assembly, the exercise device comprising:

a frame comprising a plurality of sidewalls including a top wall and a bottom wall, said plurality of sidewalls defining an interior that houses a resistance assembly;

the resistance assembly comprising one or more gear assemblies configured to provide varying levels of resistance for the exercise device;

the clamp assembly comprising a set of pressure plates adjustable between an open configuration and a closed configuration, wherein the clamp is configured to secure the exercise device to a hospital bed when in the closed configuration;

the adjustment assembly comprising a first end and a second end, wherein the first end is connected to one or more sidewalls of the frame and the second end is connected to the clamp assembly, the adjustment assembly configured to alter the position of the frame relative to the clamp assembly defining various positions of the exercise device relative to a patient;

a pedal assembly comprising two pedals rotatably attached via crank arms on opposing sidewalls of the frame, wherein each pedal is configured to receive a foot of the patient, wherein the crank arms are each respectively attached to the resistance assembly within the frame; and a wireless communication module;

wherein the frame includes a resistance control knob configured to alter the resistance required to rotate the pedals;

enabling a patient to utilize the exercise device;

collecting and transmitting exercise metrics of the patient to healthcare providers, wherein the exercise metrics are integrated in the patient's electronic medical record.

19. The method of claim 18, wherein the exercise device further includes an arm exercise unit comprising a pulley or resistance band and a handle, the exercise device configured to collect and transmit arm exercise metrics and pedal exercise metrics either separately or simultaneously.

20. The method of claim 18, wherein the patient and/or the healthcare provider can adjust settings of the exercise device via the wireless communication module.

21. The method of claim 18, wherein the exercise device further includes biometric sensors configured to collect and store patient health data that can be collected and transmitted via the wireless communication module.

* * * * *